US005272404A

United States Patent [19]

Yuhi et al.

[11] Patent Number: 5,272,404

[45] Date of Patent: Dec. 21, 1993

[54] MINIATURE MOTOR HAVING A BUILT-UP COMMUTATOR

[75] Inventors: Toshiya Yuhi; Michio Hoshino; Toru Yano; Hideo Tamura; Isamu Serizawa; Etsuo Mayumi; Takashi Ushiku; Takeshi Okumura; Kouichi Koide, all of Matsudo, Japan

[73] Assignee: Mabuchi Motor, Co., Ltd., Chiba, Japan

[21] Appl. No.: 843,621

[22] Filed: Feb. 28, 1992

[30] Foreign Application Priority Data

| | | | |
|---|---|---|---|
| Mar. 1, 1991 | [JP] | Japan | 3-034888 |
| Mar. 1, 1991 | [JP] | Japan | 3-034889 |
| May 31, 1991 | [JP] | Japan | 3-128019 |

[51] Int. Cl.[5] .............. H02K 13/04

[52] U.S. Cl. .............. 310/233; 310/40 MM; 310/42; 310/234; 310/235; 310/236

[58] Field of Search .............. 310/40 MM, 42, 233, 310/234, 235, 236, 43

[56] References Cited

U.S. PATENT DOCUMENTS

| | | | |
|---|---|---|---|
| 2,256,321 | 9/1941 | McCusker | 310/233 UX |
| 2,606,220 | 8/1952 | Labastie | 310/233 UX |
| 4,074,159 | 2/1978 | Robinson | 310/40 MM |
| 4,180,900 | 1/1980 | Klein | 29/597 |
| 4,535,264 | 8/1985 | Allport | 310/235 |
| 4,855,632 | 8/1989 | Baines | 310/233 |
| 4,956,572 | 9/1990 | Strobl | 310/233 |
| 5,008,577 | 4/1991 | Wang | 310/233 |
| 5,012,149 | 4/1991 | Strobl | 310/234 |
| 5,113,105 | 5/1992 | Ikegami | 310/233 |

FOREIGN PATENT DOCUMENTS

| | | | |
|---|---|---|---|
| 2223888 | 4/1990 | United Kingdom | 310/233 |

*Primary Examiner*—R. Skudy
*Attorney, Agent, or Firm*—McGlew and Tuttle

[57] ABSTRACT

A commutator has such a construction that a flange having an outside diameter larger than the outside diameter of a cylindrical body is provided integrally with the cylindrical body in the vicinity of one end of the cylindrical body; guide grooves formed in a circular arc shape in cross section are provided on the flange at the boundary of the flange to the cylindrical body; engaging pieces passing through the guide grooves are provided on one end of a commutator segment; and engaging pieces are caused to deform plastically to fixedly fit the engaging pieces to the flange.

3 Claims, 12 Drawing Sheets

MINIATURE MOTOR HAVING A BUILT-UP COMMUTATOR

BACKGROUND OF THE INVENTION

This invention relates generally to a miniature d-c motor used to drive power tools, automotive rear-view mirrors, and automotive door locks, etc., and more particularly to a miniature motor having a built-up commutator.

DESCRIPTION OF THE PRIOR ART

FIG. 33 is a longitudinal front view of the essential part of a miniature motor having a built-up commutator to which this invention is applied.

In FIG. 33, a motor housing 51 is formed in a cup-shaped hollow cylinder, on the inside surface of which a field magnet 52 is fixedly fitted. An end plate 53 is fitted to an open end of the motor housing 51. A rotor core 55 and a commutator 58 are fitted to a motor shaft 54, which is rotatably supported by bearings 57 and 58 provided on the end plate 53.

A rotor winding 59 is wound on the rotor core 55. A terminal portion 60 is supported by the end plate 53. A brush arm 61 supports a carbon brush 62, and is electrically connected to the terminal portion 60. The carbon brush 62 is formed in such a fashion as to make sliding contact with the outer surface of the commutator 56.

With the above construction, current is supplied from the terminal portion 60 to the rotor winding 59 via the brush arm 61, the carbon brush 62 and the commutator 56. As a result, a rotor 63 existing in a magnetic field formed by the field magnet 52 fixedly fitted on the inside surface of the motor housing 51 is caused to rotate.

There are two types in the commutator 56 as a component of the miniature motor of the above-mentioned construction; the molded type and the built-up type. Depending on the number of revolutions or the operating temperature of the motor, the built-up commutator is usually used for motors of low revolutions, while the molded commutator is for heat-resistant type motors.

The molded commutator is usually manufactured by monolithic-molding a thermoset resin into a ring-shaped commutator blank, and the molded ring-shaped commutator blank is machined to form slits between the commutator segments.

However, scatters of the width of the slits, improper roundness of the outer circumferential surface of the commutator after the completion of the commutator, and other unwanted phenomena adversely affecting motor performance often occur due to the difference in thermal expansibility between a metallic material of which the commutator segments are made and a thermoset resin of which the cylindrical body is made, or inadequate adhesion between both during molding.

In addition, burrs are produced around the slits between commutator segments during machining, requiring deburring operations. This results in increased manufacturing process and cost.

The built-up commutator, on the other hand, in which separately prepared components are mechanically assembled, involves no problems associated with the molded commutator, but encounters a strength problem and the following other problems.

FIGS. 34 and 35 are a partially longitudinal front view and a side elevation view, respectively, of a built-up commutator of a conventional type. Like parts are indicated by like numerals shown in FIG. 33.

In FIGS. 34 and 35, a commutator segment 56*a* is made of an electrically conductive material, such as copper, and formed into a circular arc shape in cross section. Three pieces, for example, of commutator segments 56*a* are fixedly fitted at radially equal spacings on the outer circumferential surface of a cylindrical body 64, which is formed into a cylindrical shape of an insulating material, via a ring 65 formed of an insulating material. A terminal portion 56*b* is used for connecting a lead wire of the rotor winding 59 shown in FIG. 33. A slit 66 is formed between the commutator segments 56*a* and 56*a*.

The built-up commutator 56 of the above-mentioned construction has an advantage in that dimensional accuracy can be improved because the cylindrical body 64, the commutator segment 56*a* and the ring 65 are manufactured separately in advance, while it has a disadvantage of inadequate strength in fitting the commutator segment 56*a* to the cylindrical body 64. Since the commutator segment 56*a* is fixedly fitted to the outer circumferential surface of the cylindrical body 64 only by the press-fitting force of the ring 65, the bonding strength produced by press-fitting or sandwiching is limited. This could lead to displacement of the commutator segment 56*a*, and irregular circumferential widths of slits 66 due to vibration and other external forces.

The built-up commutator 56 which requires the ring 65 to assemble the segments and the cylindrical body poses a cost disadvantage and limits the effective axial length of the commutator segment 56*a* by the width of the ring 65, requiring an increased axial length of the commutator 56. This presents an obstacle in further downsizing the miniature motors.

In recent years, on the other hand, requirements for the downsizing, higher performance and lower cost of miniature motors of this type have become increasingly stringent to such an extent that miniature motors having commutators of the conventional types can no longer meet such severe requirements.

SUMMARY OF THE INVENTION

This invention is intended to solve these problems. To achieve these objectives, a miniature motor having a built-up commutator of this invention has a built-up commutator consisting of a cylindrical body made of an insulating material, and a plurality of commutator segments formed of an electrically conductive material into a circular arc shape in cross section and fixedly fitted to the outer circumferential surface of the cylindrical body. The commutator according to this invention has such a construction that a flange formed into an outside diameter larger than the outside diameter of the cylindrical body is integrally provided with the cylindrical body in the vicinity of one end of the cylindrical body; guide grooves formed into a circular arc shape in cross section are provided on the flange at the boundary to the cylindrical body and pass through the flange; engaging pieces passing through the guide grooves are provided at one end of the commutator segments; tips of the engaging pieces are slit in the axial direction, and at least one of the slit tips is caused to deform plastically in the circumferential direction of the cylindrical body to fixedly fitted the engaging pieces to the flange.

The miniature motor having a built-up commutator of this invention has projections formed into a width smaller than the circumferential width of the guide grooves are provided on the outside inner circumferential surface of the guide grooves; the engaging pieces being pushed in the axial center direction in the guide grooves and brought into close contact with the inside inner circumferential surface of the guide grooves.

The miniature motor having a built-up commutator of this invention has such a construction that the engaging pieces are fixedly fitted to the flange by causing the tips of the engaging pieces, which are passed through the guide grooves of the flange, to deform plastically in the circumferential direction of the cylindrical body.

The miniature motor having a built-up commutator of this invention has such a construction that a flange formed into an outside diameter larger than the outside diameter of the cylindrical body is provided integrally with the cylindrical body in the vicinity of one end of the cylindrical body; guide grooves formed into a ring shape or a circular arc shape in cross section are provided on the flange at the boundary to the cylindrical body; a plurality of recesses are provided on the other end of the cylindrical body; engaging pieces fixedly fitted to the guide grooves and terminal portions protruding outwards along the flange are provided on one end of the commutator segment; bent portions for engaging with the recesses are provided on the other end of the commutator segment; the engaging pieces of the commutator segment are inserted into the guide grooves of the flange, and the bent portions are fixedly fitted to the recesses of the cylindrical body by plastic deformation in the circumferential direction.

These and other objects of this invention will become more apparent by referring to the following description, taken in conjunction with FIGS. 1 through 32.

DETAILED DESCRIPTION OF THE EMBODIMENT

Figure 1:
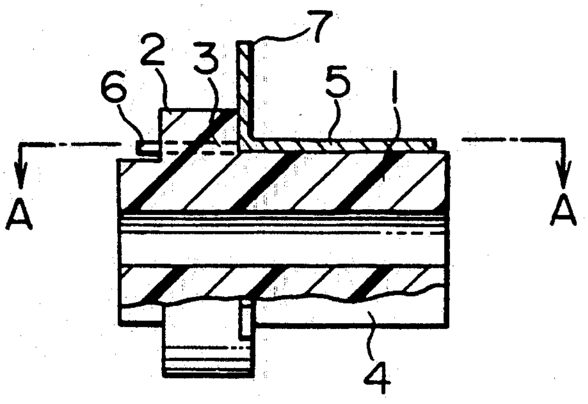
FIG. 1 is a longitudinal sectional front view illustrating the essential part of a commutator embodying this invention.
Figure 2:
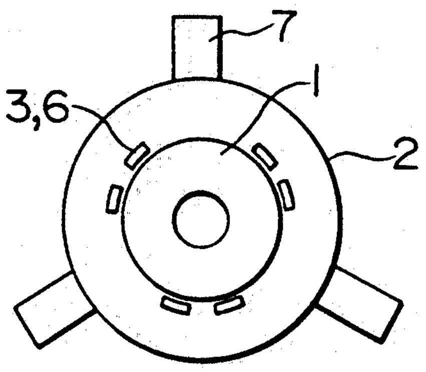
FIG. 2 is a left-end view illustrating a commutator embodying this invention.
Figure 3:
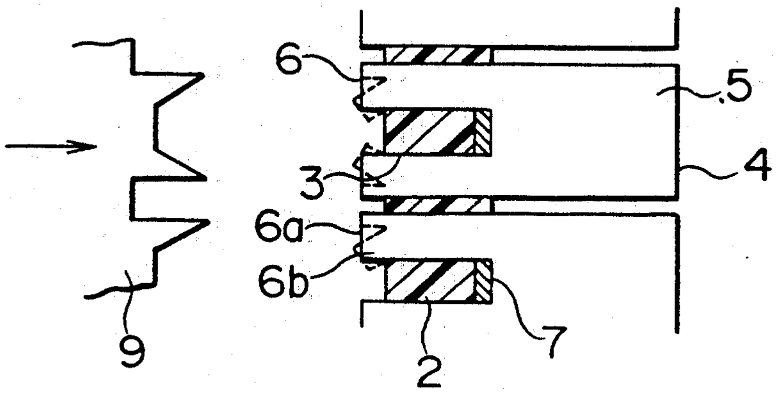
FIG. 3 is a cross-sectional development taken along line A—A shown in FIG. 1.

FIGS. 1 and 2 are a longitudinal sectional front view and left-end view illustrating a commutator in an embodiment of this invention, respectively. FIG. 3 is a cross-sectional development taken along line A—A in FIG. 1.

In these figures, a cylindrical body 1 is formed of a thermoset resin, such as phenol or epoxy resin, into a hollow cylindrical shape, and a flange 2 formed into an outside diameter larger than the outside diameter of the cylindrical body 1 is provided integrally with the cylindrical body 2 in the vicinity of an end of the cylindrical body 2.

Guide grooves 3 are formed into a circular arc shape in cross section, and provided in such a manner as to pass through the flange 2 at the boundary to the cylindrical body 1 and to be parallel with the axis thereof. A commutator segment 4 is formed of an electrically conductive material, such as copper, and a base 5, which will be described later, engaging pieces 6 and a terminal portion 7 are provided integrally with the commutator segment 4.

Figure 4:
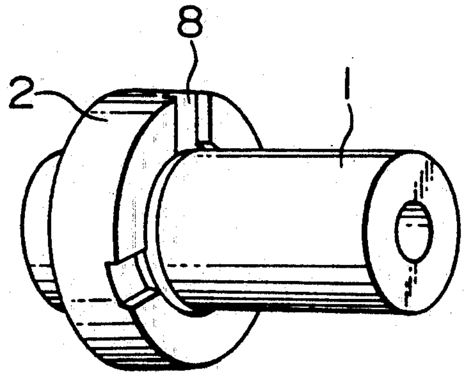
FIG. 4 is a perspective view illustrating a cylindrical body shown in FIGS. 1 and 2.
Figure 5:
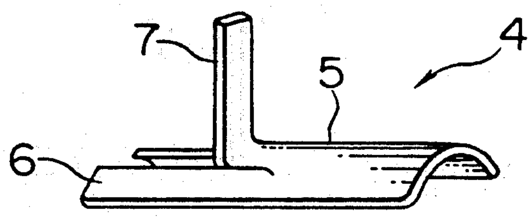
FIG. 5 is a perspective view illustrating a commutator segment shown in FIGS. 1 and 2.

FIGS. 4 and 5 are perspective views illustrating the cylindrical body 1 and the commutator segment 4 shown in FIGS. 1 and 2. Like parts are indicated by like numerals in FIGS. 1 and 2.

In FIG. 4, grooves 8 are disposed radially at equal spacings in the circumferential direction on the end face of the flange 2, and used for positioning the commutator segments 4, as will be described later.

In FIG. 5, the base 5 of the commutator segment 4 is formed into a circular arc shape in cross section, corresponding to the outer circumferential surface of the cylindrical body 1 shown in FIG. 4. At an end of the commutator segment 4 provided are engaging pieces 6 and a terminal portion 7. Two engaging pieces 6 are provided on the end edge of the commutator segment 4, and the terminal portion 7 is bent in such a manner as to protrude outwards from the intermediate portion of the engaging piece 6 along the end face of the flange 2 shown in FIG. 4.

Next, description will be made on the assembly of the commutator having the above-mentioned construction.

As shown in FIGS. 1 through 3, the commutator segment 4 is disposed on the outer periphery of the cylindrical body 1. The engaging pieces 6 of the commutator segment 4 are inserted into the guide grooves 3 provided on the flange 2. The terminal portion 7 of the commutator segment 4 is engaged with the groove 8 (not shown, Refer to FIG. 4.) provided on the end face of the flange 2 to position the commutator segment 4 in the circumferential and axial directions.

Figure 6:
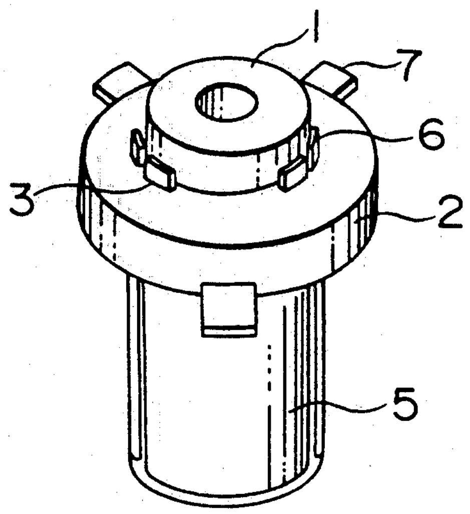
FIG. 6 is a perspective view illustrating the state where a commutator segment is positioned on the outer circumferential surface of a cylindrical body.

FIG. 6 is a perspective view illustrating the state where the commutator segments 4 are disposed and positioned on the outer circumferential surface of the cylindrical body 1.

As shown in FIG. 6, the engaging piece 6 passes through the guide groove 3 on the flange 2 and protrudes from the end face opposite to the flange 2. Next, a cutting and bending blade 9 as shown in FIG. 3 is forced in the direction shown by an arrow in the figure in between the engaging pieces 6 and 6 protruding from the end face of the flange 2 to provide a notch *6a* as shown by dotted lines in the figure on the engaging piece 6. By causing the notch *6a* to deform plastically in the circumferential direction and press-fitting the notch *6a* to the flange 2, the commutator segment 4 is fixedly fitted to the cylindrical body 1. In this case, the outer periphery of the base 5 of the commutator segment 4 is held by a collet chuck, for example.

Figure 7:
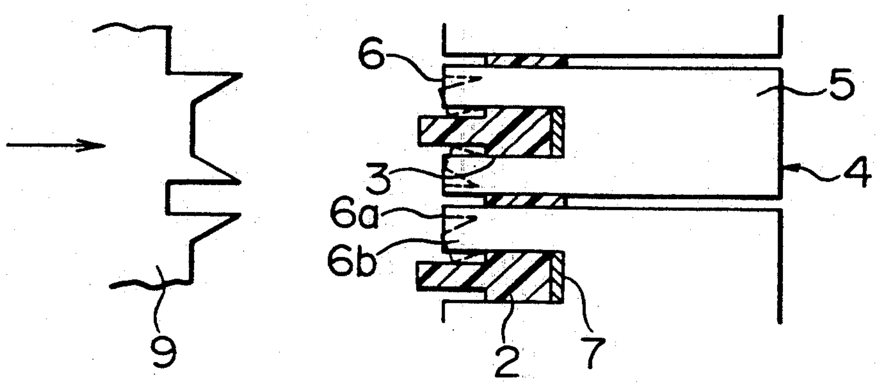
FIG. 7 is a partially cross-sectional development illustrating a modified example of guide grooves and engaging pieces in an embodiment of this invention.
Figure 8:
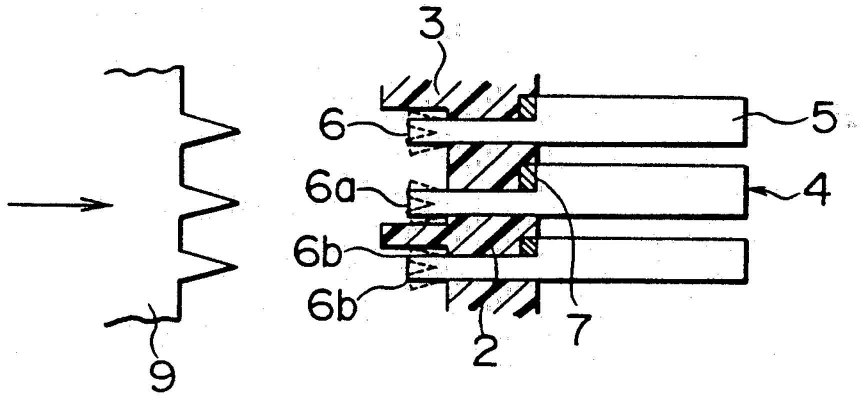
FIG. 8 is a partially cross-sectional development illustrating a modified example of guide grooves and engaging pieces in an embodiment of this invention.

FIGS. 7 and 8 are partially cross-sectional developments illustrating modified examples of the guide groove 3 and the engaging piece 6, corresponding to FIG. 3.

Figure 33:
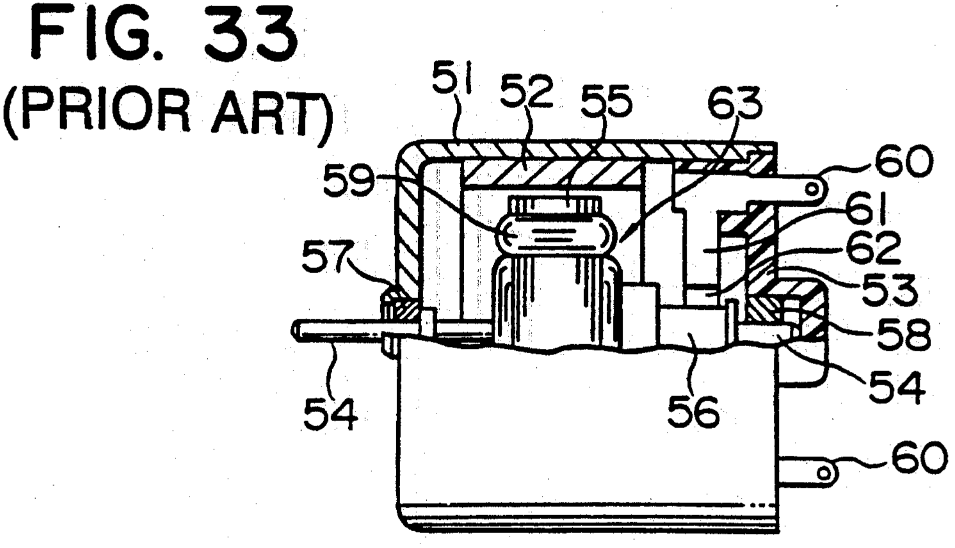
FIG. 33 (PRIOR ART)
FIGS. 33-35, show "prior art" arrangements.
Figure 34:
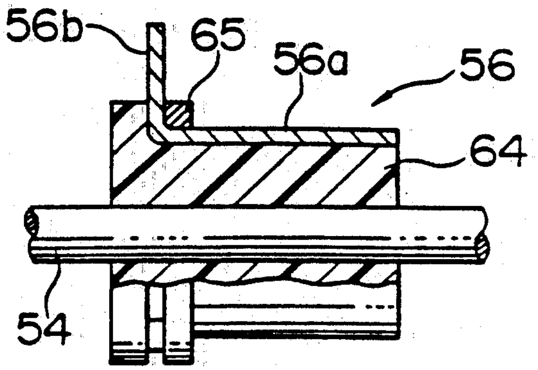
FIG. 34 (PRIOR ART)
Figure 35:
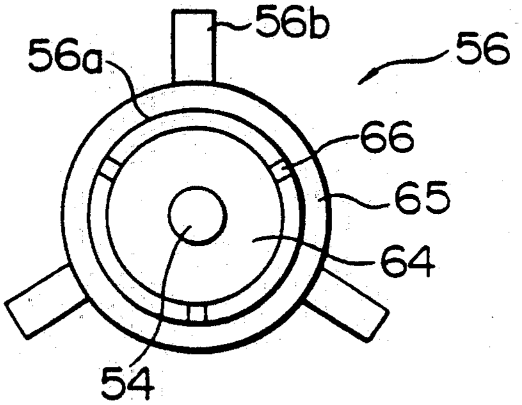
FIG. 35 (PRIOR ART)

In FIG. 7, the axial length of the flange 2 is made slightly longer than the axial length of the engaging piece 6. By forming the flange 2 in such dimensions, the tip of the engaging piece 6 does not protrude from the flange 2, thus being prevented from making unwanted contact with the rotor winding (not shown, Refer to numeral 59 in FIG. 33.)

FIG. 8 shows an engaging piece 6 to be provided on the commutator segment 4. In FIG. 8, lanced pieces *6b* and *6b* are plastically deformed to both sides from the notch or slit *6a* by staking bar 9 acting on tips of the segments 4. Also see FIG's 1 and 2. By forming the lanced pieces *6b* and *6b* in this way, the width of the engaging piece 6 can be maintained, and a predetermined bonding strength can be effectively maintained in cases where a multi-pole commutator, such as that having more than five commutator segments 4, is required.

Figure 9:
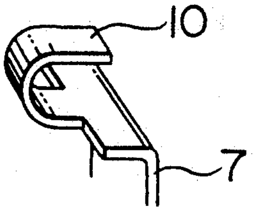
FIG. 9 is an enlarged perspective view illustrating the essential part of a modified example of a terminal portion.
Figure 10:
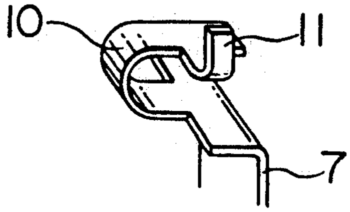
FIG. 10 is an enlarged perspective view illustrating the essential part of a modified example of a terminal portion.

FIGS. 9 and 10 are enlarged perspective views illustrating the essential part of modified examples of the terminal portion 7, respectively.

In FIGS. 9 and 10, the terminals 10 and 11 are provided integrally with the tip of the terminal portion 7. The terminals 10 and 11 are for connecting the lead wires of the rotor winding, or installing varistors and other component members.

Figure 11:
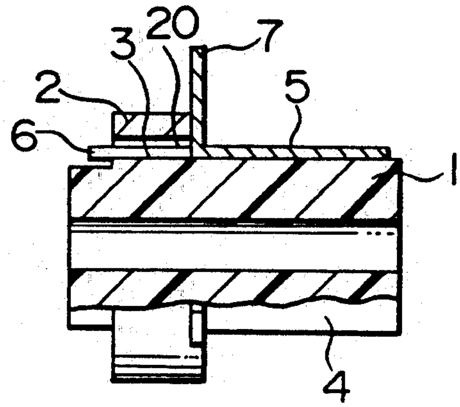
FIG. 11 is a longitudinal sectional front view illustrating the essential part of a commutator in another embodiment of this invention.
Figure 12:
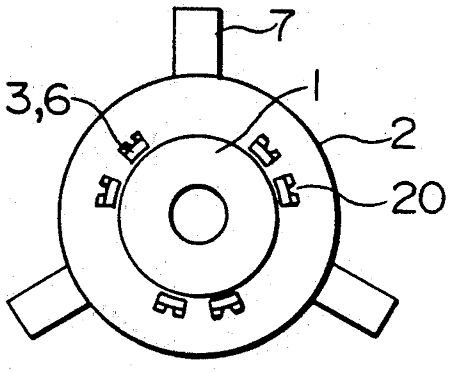
FIG. 12 is an end view illustrating a commutator in another embodiment of this invention.

FIGS. 11 and 12 are a longitudinal sectional front view and left-end view illustrating the commutator in another embodiment of this invention. Like parts are indicated by like numerals shown in FIGS. 1 and 2.

In FIGS. 11 and 12, a projection 20 is formed on the outside inner circumferential surface of the guide groove 3 into a width smaller than the circumferential width of the guide groove 3.

With the above-mentioned construction, the commutator segment 4 is disposed on the outer periphery of the cylindrical body 1. The engaging piece 6 is press-fitted into the guide groove 3 provided on the flange 2, and pushed by the projection 20 toward the axial center to make close contact with, and fixedly fitted to, the inside inner circumferential surface of the guide groove 3. The tip of the engaging piece 6 are slit and deformed plastically in the same manner as shown in FIGS. 3, 7 and 8.

Figure 13:
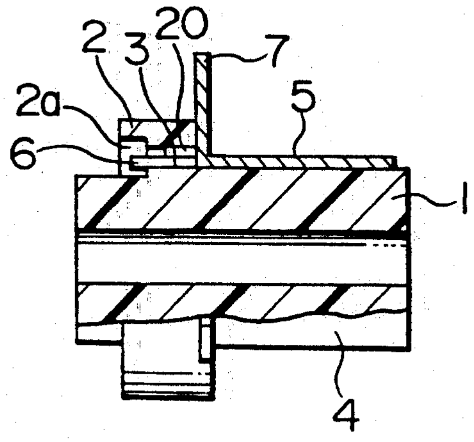
FIG. 13 is a longitudinal sectional front view illustrating a modified example of a flange and a projection.

FIG. 13 is a longitudinal sectional front view illustrating the essential part of a modified example of the flange 2 and the projection 20.

In FIG. 13, a recess *2a* is provided at the left-end face of the flange 2. The projection 20 is formed into an axial length smaller than the axial length of the guide groove 3. The tip of the engaging piece 6 is formed in such a manner as not to protrude from the end face of the flange 2.

With the aforementioned construction, unwanted accidents due to the projected tip of the engaging piece 6 from the end face of the flange 2 can be prevented, as in the case of the examples shown in FIG. 7 and 8.

Figure 14:
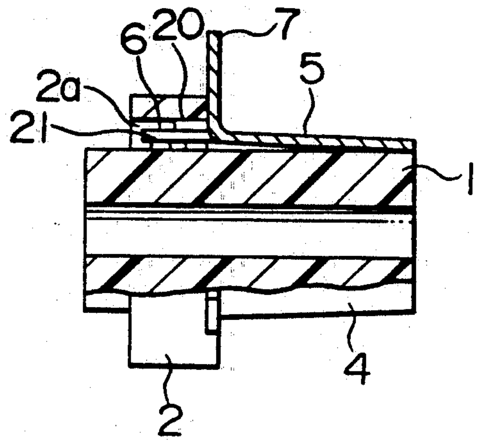
FIG. 14 is a longitudinal sectional front view illustrating a commutator segment in still another embodiment of this invention.
Figure 15:
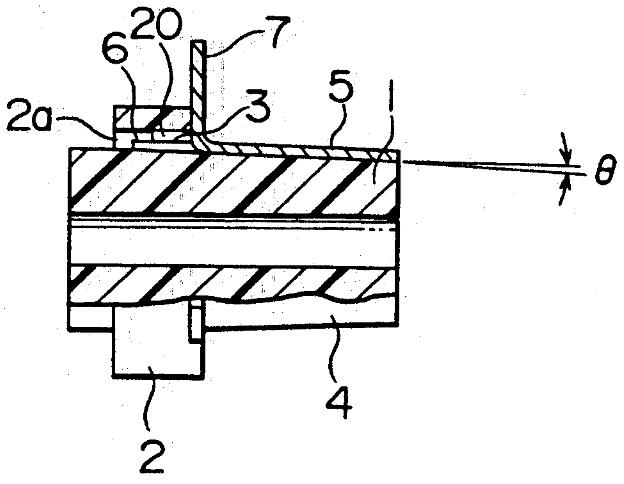
FIG. 15 is a longitudinal sectional front view illustrating a commutator segment in still another embodiment of this invention.

FIGS. 14 and 15 are longitudinal sectional front view illustrating the essential part of a commutator segment in still other examples of this invention where a slight taper is provided on the base 5 of the commutator segment 4. Like parts are indicated by like numerals in the previous embodiments.

In FIG. 14, the projection 21 is provided on the inside inner circumferential surface, and on the side of the left-end face of the flange 2 with respect to the projection 20.

In FIG. 15, a taper having an angle $\theta$ with respect to the axial line is provided on the outer circumferential surface of the cylindrical body 1 corresponding to the base 5 of the commutator segment 4 and the engaging piece 6, and on the inside inner circumferential surface of the guide groove 3.

With the aforementioned construction, a larger pushing force is exerted by the projection 20 provided in the guide groove 3 of the flange 2 in the axial center direction, and thereby the commutator segment 4 can be brought into close contact with the cylindrical body 1.

The method of slitting the tip of the engaging piece 6 is similar to that in the previous embodiments.

Figure 16:
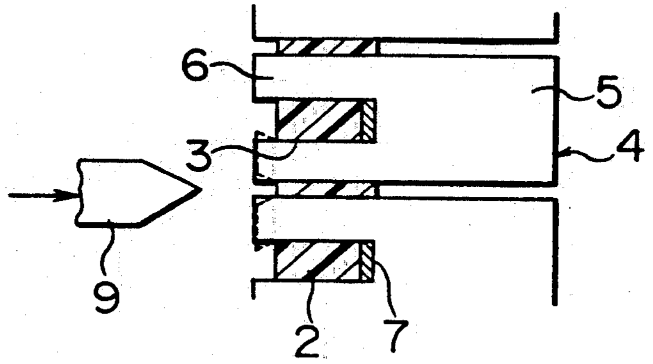
FIG. 16 is a cross-sectional development taken along line A—A in FIG. 1.
Figure 17:
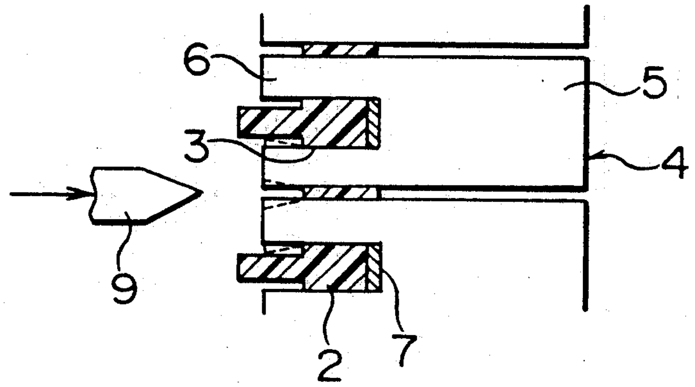
FIG. 17 is a partially sectional development illustrating a modified example of guide grooves and engaging pieces in an embodiment of this invention.
Figure 18:
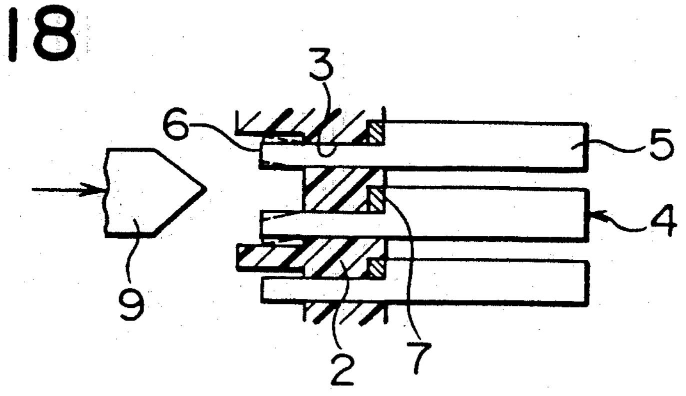
FIG. 18 is a partially sectional development illustrating a modified example of guide grooves and engaging pieces in an embodiment of this invention.

FIGS. 16 through 18 are partially cross-sectional developments illustrating modified examples of the guide groove 3 and the engaging piece 6 in the embodiments of this invention.

In FIG. 16, the commutator segment 4 is fixedly fitted to the cylindrical body 1 by forcing a staking bar 9, for example, in between the protruding engaging pieces 6 in the direction shown by an arrow in the figure to cause the engaging piece 6 to plastically deform in the circumferential direction as shown by a dotted line, thereby press-fitting the engaging piece 6 to the flange 2. In this case, the commutator segment 4 should preferably be held at the outer periphery thereof by a collet chuck, for example.

In FIG. 17, the axial length or width of the flange 2 is made larger than the axial length of the engaging piece 6. By forming the flange 2 in this way, the tip of the engaging piece 6 is prevented from protruding from the flange 2, and thus from making unwanted contact with the rotor winding (not shown, Refer to numeral 59 in FIG. 33.)

In FIG. 18, the engaging piece 6 is provided on one of the commutator segments 4. By providing in this way, the width of the engaging piece 6 can be maintained and a predetermined bonding strength can be maintained in cases where a multi-pole commutator having other than five commutator segments is required.

Now, other embodiments of this invention will be described, referring to FIGS. 19 through 32.

Figure 19:
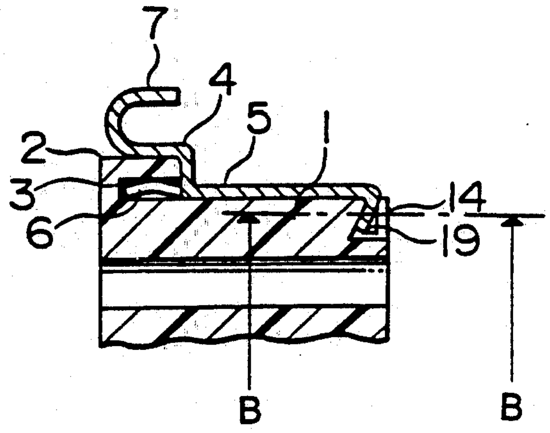
FIG. 19 is a longitudinal sectional view illustrating the essential part of a commutator in an embodiment of this invention.
Figure 20:
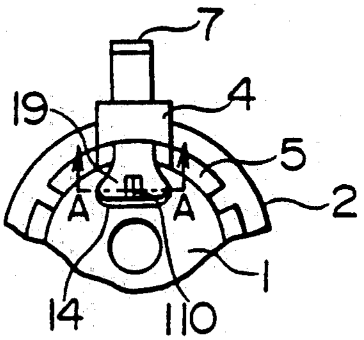
FIG. 20 is an end view illustrating the essential part of a commutator in an embodiment of this invention.
Figure 21:
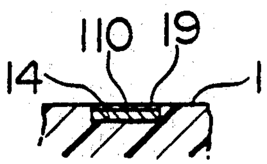
FIG. 21 is a cross-sectional view taken along line A—A in FIG. 20 and also taken along line B—B in FIG. 19.
Figure 22:
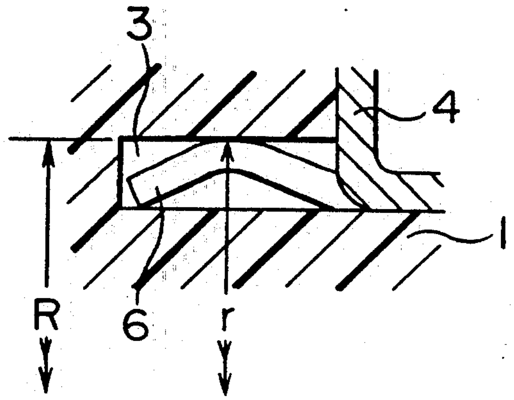
FIG. 22 is an enlarged sectional view illustrating the neighborhood of a guide groove and an engaging piece.

FIGS. 19 and 20 are a longitudinal sectional view and end view illustrating the essential part of a commutator segment in an embodiment of this invention. FIG. 21 is a cross-sectional view taken along line A—A of FIG. 20. FIG. 22 is an enlarged cross-sectional view of the engaging piece in an embodiment of this invention.

In these figures, a cylindrical body 1 is formed of a thermoset resin, such as phenol or epoxy resin, into a hollow cylindrical shape, and a flange 2 formed into an outside diameter larger than the outside diameter of the cylindrical body 2 is provided integrally with the cylindrical body 2 in the vicinity of an end of the cylindrical body 2.

Guide grooves 3 are formed into a circular arc shape in cross section, and provided in such a manner as to pass through the flange 2 at the boundary to the cylindrical body 1 and to be parallel with the axis. A plurality of trapezoidal or triangular recesses 14 are provided on the end face opposite to the flange 2 of the cylindrical body 1. The end face of the recess 14 is formed into a triangular or dovetail shape. The recesses 14 are disposed at equal spacings in the circumferential direction.

A commutator segment 4 is made of an electrically conductive material, such as copper, and consists of a base 5, an engaging piece 6, a terminal portion 7 and a bent portion 19 of approximately triangular shape.

Figure 23:
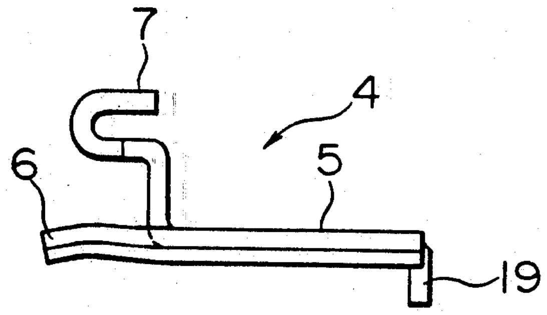
FIG. 23 is a front view illustrating the commutator segment shown in FIGS. 19 and 20.
Figure 24:
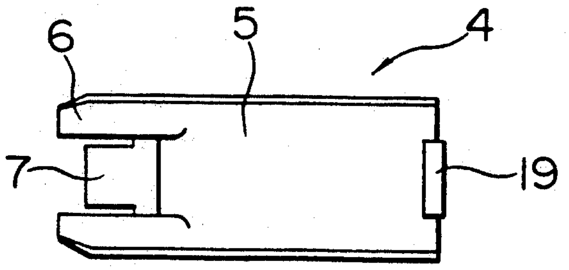
FIG. 24 is a bottom view illustrating the commutator segment in FIGS. 19 and 20.
Figure 25:
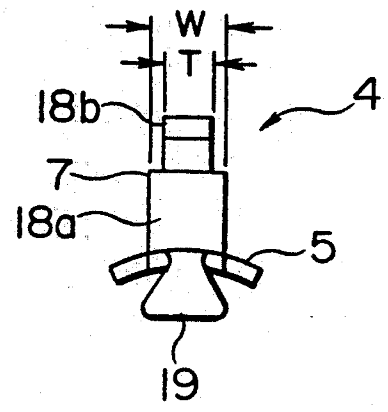
FIG. 25 is a right-end view illustrating the commutator segment shown in FIGS. 19 and 20.

FIGS. 23 through 25 are a front view, bottom view and right-end view illustrating the commutator segment 4 shown in FIGS. 19 and 20. Like parts are indicated by like numerals in FIGS. 19 and 20.

In FIGS. 23 through 25, the base 5 is formed into a circular arc shape in cross section, corresponding to the outer circumferential surface of the cylindrical body 1 shown in FIGS. 19 and 20.

On an end of the commutator segment 4 provided are engaging pieces 6 and a terminal portion 7. Two engaging pieces 6 are provided along the end edge of the commutator segment 4. The engaging pieces 6 are bent as shown in FIG. 23.

The terminal portion 7 is formed in such a manner as to protrude from the intermediate part of the engaging piece 6 outwards along the end face and the outer circumferential surface of the flange 2 shown in FIGS. 19 and 20. The protruded end of the terminal portion 7 is formed into a U shape, for example, as shown in FIG. 23. The terminal portion 7 is formed in such a fashion that the width T of the end part thereof is smaller than the width W of the foot part 7*a* thereof rising from the base 5, that is, $T<W$. (Refer to FIG. 25.) On the other end of the commutator segment 4 provided is a bent portion 19 whose end face is formed into a triangular or dovetail shape, for example. The bent portion 19 and the engaging piece 6 are formed in such a fashion that the bent portion 19 and the engaging portion 6 are engaged and fitted to the recess 14 and the guide groove 3 shown in FIGS. 19 through 21.

Now, description will be made about the method of assembling the commutator having the above-mentioned construction.

As shown in FIGS. 19 and 20, the commutator segment 4 is disposed on the outer periphery of the cylindrical body 1. The engaging piece 6 of the commutator segment 4 is inserted and fitted into the guide groove 3 provided on the flange 2. Since the radial length r from the axial line of the engaging piece 6 is formed larger than the radial length R from the axial line of the outside inner circumferential surface of the guide groove 3, as shown in FIG. 22, the engaging piece 6 is caused to be slightly deformed plastically and make close contact with the inner wall of the guide groove 3 as the engaging piece 6 is inserted into the guide groove 3 while being bent in such a manner that the upper surface of the engaging piece 6 becomes concave. Thus, the commutator segment 4 is prevented from coming off in the axial direction.

In FIGS. 19 through 21, the bent portin 19 is bent and engaged with the recess 14. When a recess 110 as shown in FIG. 21 is formed on the bent portion 19 by a tool, like a knife, the bent portion 19 is caused to be deformed plastically in the circumferential direction of the end face due to upsetting or staking, thereby making close contact with, or press-fitting to, the recess 14 provided on the cylindrical body 1. Thus, the commutator segment 4 is securely fitted to the cylindrical body 1. When upsetting or staking the bent portion 19, the outer periphery of the base 5 of the commutator segment 4 is held by a collet chuck, for exmaple.

After the commutator segment 4 is fixedly fitted to the cylindrical body 1, the lead wire of the rotor winding is hooked on the terminal portion 7 and connected thereto by resistance welding. In this case, since the foot portion 18*a* and the end portion 18*b* of the terminal portion 7 are formed so that the width W of the foot portion 18*a* is made smaller than the width T of the end portion 18*b*, as shown in FIG. 25, the foot portion 18*a* is prevented from being heated, and the heat is effectively concentrated on the end portion 18*b*, making the connection easy. When the width T of the end portion 18*b* is equal to the width W of the foot portion 18*a*, on the other hand, an area near the foot portion 18*a* is heated before the lead wire is fused to the end portion 18*b*. This could cause the covering of the lead wire to be melted away.

Figure 26:
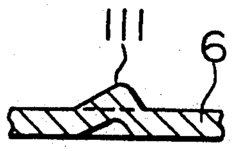
FIG. 26 is a longitudinal sectional view illustrating a modified example of the engaging piece shown in FIGS. 19 and 20.

FIG. 26 is a longitudinal sectional view of the essential part of a modified example of the engaging piece 6 in FIGS. 19 and 22.

In FIG. 26, the projection 111 is provided on part of the engaging piece 6 by stamping, for example. In this case, the radial length of the projection 111 from the axial line is of course made similar to that shown in FIG. 22. As the engaging piece 6 formed in such a fashion is inserted into the guide groove 3 shown in FIGS. 19 and 22, the commutator segment 4 is prevented from coming off in the axial direction.

Figure 27:
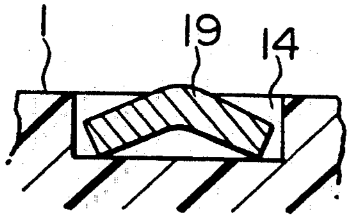
FIG. 27 is an enlarged cross-sectional view illustrating the bent portion in FIGS. 20 and 21. FIG. **27*a*** is an enlarged cross-sectional view illustrating a further embodiment of tapered side wall.
Figure 28:
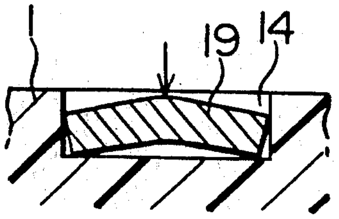
FIG. 28 is an enlarged cross-sectional view illustrating a modified example of the bent portion in FIGS. 20 and 21.

FIGS. 27 and 28 are enlarged cross-sectional views illustrating a modified example of the bent portion 19 in FIGS. 20 and 21.

In FIGS. 27 and 28, the bent portion 19 is formed by bending, for example, in such a fashion that the upper surface of the bent portion 19 become convex, and engaged with the recess 14. After that, when the bent portion 19 is pushed or hit in the direction shown by an arrow as shown in FIG. 28, by a jig (not shown), the bent portion 19 is press-fitted to the recess 14 by the plastic deformation thereof, and fixedly fitted to the cylindrical body 1.

Figure 27A:
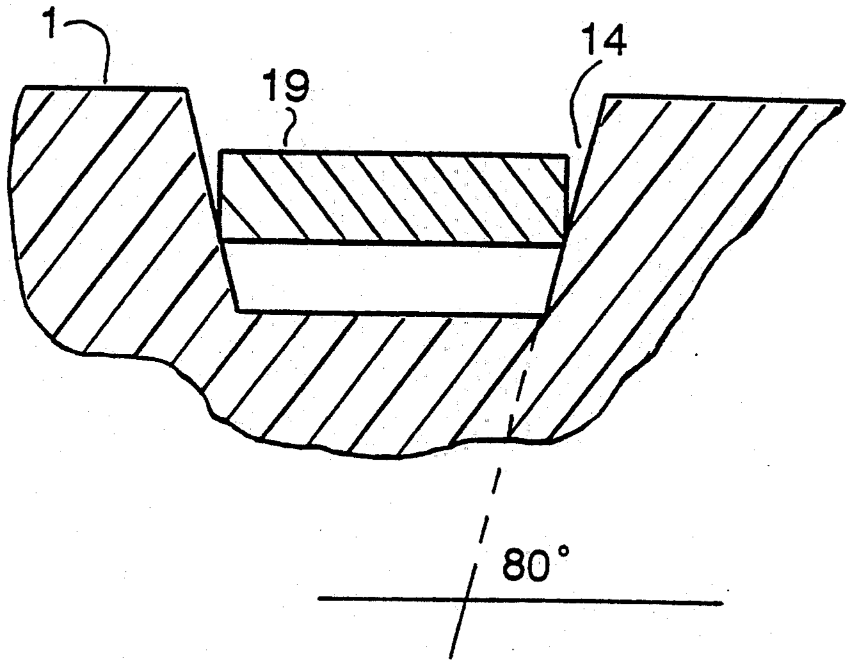

FIGS. 27 and 28 show a recess 14 having side walls rising at right angles to a bottom surface. However, as shown in FIG. 27*a*, the recess 14 can be provided having tapered side walls, at an angle of about 80°. In the case of such tapered side walls (see FIG. 27*a*), it is not necessary to give a plastic deformation to the engaging piece or bent portion 19. As shown in FIG. 27*a*, the engaging piece 19 is not bent or deformed.

Figure 29:
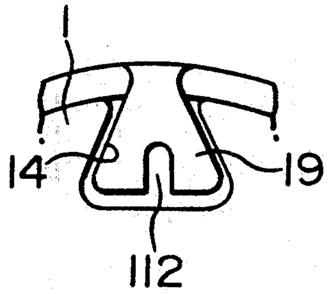
FIG. 29 is an end view illustrating another modified example of the bent portion in FIG. 20.
Figure 30:
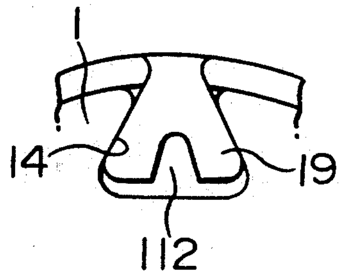
FIG. 30 is an end view illustrating another example of the bent portion shown in FIG. 20.

In FIGS. 29 and 30, the notch 112 is provided on an end of the bent portion 19. After the bent portion 19 is engaged with the recess 14, as shown in FIG. 29, the notch 112 is open apart by a jig, as shown in FIG. 30, then the bent portion 19 is press-fitted to the recess 14 by the plastic deformation thereof, and fixedly fitted to the cylindrical body 1.

Figure 31:
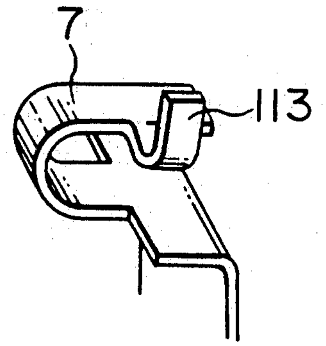
FIG. 31 is an enlarged perspective view illustrating the essential part of a modified example of the terminal portion shown in FIGS. 19 and 20.
Figure 32:
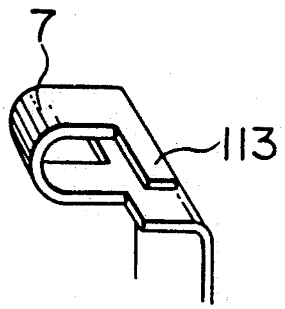
FIG. 32 is an enlarged perspective view illustrating a modified example of the terminal portion shown in FIGS. 19 and 20.

FIGS. 31 and 32 are enlarged perspective views illustrating the essential part of a modified example of the terminal portion 7 shown in FIGS. 1 and 2.

In FIGS. 31 and 32, the terminal 113 is provided integrally with the terminal portion 7. The terminal 113 is used for installing other component members, such as a varistor, for example.

In the above embodiments, description is made about examples where the cylindrical body and the flange are made of a thermoset resin. They may be made of a thermoplastic resin. The method of forming them may be injection molding and other publicly known modling means. The guide groove provided on the flange may be formed in such a fashion that part or whole of the guide groove passes through the flange. In short, the guide groove may be of any shape and size so long as the engaging piece can be inserted, positioned and fixedly fitted into the guide groove. Furthermore, the recess provided on the end face of the cylindrical body, and the end face of the bent portion engaging with the recess may be of any shape that can be selected in accordance with the specifications required for the commutator.

This invention having the aforementioned construction and operation can achieve the following effects.

1. Since the commutator segments are fixedly fitted to the cylindrical body, no inconveniences, such as displacement of the commutator segments, irregular slit width, etc. are caused even when vibration due to motor revolution and other external forces are exerted. This results in high-performance and high-reliability miniature motors.

2. Because no ring is required to fixedly fit the commutator segments to the cylindrical body, the number of required components can be reduced, assembly work is facilitated, and manufacturing manhours and cost can be reduced.

3. Since a ring to fixedly fit the commutator segments to the cylindrical body is not needed, the axial length of the commutator segments need not be limited. This makes it possible to reduce the size of a miniature motor as a whole.

While specific embodiments of the invention have been shown and described in detail to illustrate the application of the principles of the invention, it will be understood that the invention may be embodied otherwise without departing from such principles.

What is claimed is:

1. A miniature motor having a built-up commutator comprising a cylindrical body made of an insulating material, and a plurality of commutator segments fixedly fitted to an outer circumferential surface of said cylindrical body, made of an electrically conductive material and formed into a circular arc shape in cross section, a flange formed into an outside diameter larger than an outside diameter of said cylindrical body is provided integrally with said cylindrical body in an end of said cylindrical body, and guide grooves passing in an axial direction through said flange are provided on said flange adjacent said cylindrical body;

engaging pieces passing through said guide grooves are provided on an end of said commutator segments;

said engaging pieces having tips extending out of said guide grooves on said flange, lanced pieces being provided, on sides of slits formed in said tips, said slits extending in an axial direction; and said engaging pieces are fixedly fitted to said flange by plastically deforming at least one of said lanced pieces in a circumferential direction of said cylindrical body.

2. A miniature motor having a built-up commutator comprising a cylindrical body made of an insulating material, and a plurality of commutator segments fixedly fitted to an outer circumferential surface of said cylindrical body, made of an electrically conductive material and formed into a circular arc shape in cross section, a flange formed into an outside diameter larger than an outside diameter of said cylindrical body is provided integrally with said cylindrical body in an end of said cylindrical body, and guide grooves formed into a circular arc shape in cross section and passing through said flange in an axial direction are provided on said flange;

engaging pieces passing through said guide grooves are provided on an end of said commutator segments;

said engaging pieces having tips peeped out of said guide grooves on said flange, and fixedly fitted to said flange by plastically deforming tips of said engaging pieces in a circumferential direction of said cylindrical body.

3. A miniature motor having a built-up commutator comprising a cylindrical body made of an insulating material, and a plurality of commutator segments fixedly fitted to an outer circumferential surface of said cylindrical body, made of an electrically conductive material and formed into a circular arc shape in cross section;

a flange formed into an outside diameter larger than an outside diameter of said cylindrical body is provided integrally with said cylindrical body in an end of said cylindrical body, and guide grooves having a circular arc shape in cross section are provided on said flange;

a plurality of recesses are provided on another end face of said cylindrical body, each of said recesses being formed into a triangular shape;

engaging pieces fitted to said guide grooves, and terminal portions protruding outwards along said flange are provided on an end of said commutator segments;

bent portions formed into a triangular shape for engaging with said recesses are provided on the other end of said commutator segments; and said engaging pieces of said commutator segments are inserted and fitted into said guide grooves on said flange, and said bent portions are fixedly fitted to said recesses on said cylindrical body by plastic deformation thereof in a circumferential direction, the plastic deformation being formed by providing a notch on each of said bent portions.

* * * * *